United States Patent
Somuah (10) Patent No.: US 7,533,860 B2
(45) Date of Patent: May 19, 2009

(54) BEVERAGE CUP HOLDER

(76) Inventor: Eddie Somuah, 52 Milford Hunt La., Milford, CT (US) 06461

( * ) Notice: Subject to any disclaimer, the term of this patent is extended or adjusted under 35 U.S.C. 154(b) by 169 days.

(21) Appl. No.: 11/623,086

(22) Filed: Jan. 14, 2007

(65) Prior Publication Data

US 2008/0169397 A1     Jul. 17, 2008

(51) Int. Cl.
*A47K 1/08*     (2006.01)
(52) U.S. Cl. ............... 248/311.2; 248/149; 248/150; 206/217; 224/926; 220/737
(58) Field of Classification Search ........... 348/311.2, 348/312.1, 312, 146, 149, 150, 154, 104, 348/106, 107; 206/217; 220/482, 737, 480, 220/629, 630; 224/926, 275, 482, 552, 554, 224/567, 570, 42.38, 42.4
See application file for complete search history.

(56) References Cited

U.S. PATENT DOCUMENTS

| | | | |
|---|---|---|---|
| 4,379,541 A * | 4/1983 | Harkness | 248/544 |
| 4,630,319 A | 12/1986 | Mathis | |
| 4,655,425 A * | 4/1987 | Wallace et al. | 248/311.2 |
| 4,767,092 A * | 8/1988 | Weatherly | 248/311.2 |
| 4,951,910 A * | 8/1990 | March | 248/311.2 |
| 4,997,157 A * | 3/1991 | Sweeny | 248/313 |
| 5,003,725 A * | 4/1991 | Maddox | 47/39 |
| 5,042,770 A * | 8/1991 | Louthan | 248/311.2 |
| 5,071,100 A * | 12/1991 | Sweeny | 248/313 |
| 5,244,175 A | 9/1993 | Frankel | |
| 5,361,950 A * | 11/1994 | Signal et al. | 224/585 |
| 6,000,575 A | 12/1999 | LaCour et al. | |
| 6,047,937 A | 4/2000 | Huang | |
| 6,296,165 B1 | 10/2001 | Mears | |
| 6,409,066 B1 | 6/2002 | Schneider et al. | |
| 6,409,137 B1 | 6/2002 | Tran | |
| 6,457,772 B1 | 10/2002 | Forston | |
| 6,520,575 B1 | 2/2003 | Yuzawa | |
| 2004/0188278 A1 | 9/2004 | Krisko et al. | |

FOREIGN PATENT DOCUMENTS

GB     2345681     12/1999

* cited by examiner

*Primary Examiner*—A. Joseph Wujciak, III
(74) *Attorney, Agent, or Firm*—Christopher Wood; Wood & Eisenberg, PLLC (57) ABSTRACT

A beverage cup holder. The beverage cup holder has a housing with a top and bottom, and includes first and second opposing arms for gripping the sidewalls of a cup or beverage container. The first and second opposing arms each comprise a plurality of telescoping chain-links. A retractable bottom support arm extends from the bottom of the housing for supporting the base of a beverage container. A retractable cup holder support arm extends from the top of the housing.

3 Claims, 11 Drawing Sheets

BEVERAGE CUP HOLDER

CROSS-REFERENCE TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates to beverage cup holders.

BACKGROUND OF THE INVENTION

The fast pace of life found in many modern economies has become synonymous with on-the-move cups of coffee and beverage drinks. Modern automobiles perhaps best typify this trend fitted as they are with convenient cup holders that have allowed drivers and passengers to partake of coffee and other beverages without having to balance cups or cans on persons' laps or on the floor of the vehicles. Cinema seating is not replete without cup holders fitted to the backs of cinema seats.

It is not uncommon however, for cup holders to be damaged or broken thus necessitating drivers or their passengers to revert to placing cups on vehicle floors or balanced between the legs hoping that the contents don't spill and stain clothing or car seat. Older trains in need of refurbishment often lack reliable cup holders. Thus, there is a need for a cup holder design to enable drinkers to confidently keep a cup in place without having to perform some kind of balancing act.

A review of the prior art follows.

U.S. Pat. No. 6,409,137 issued to Tran describes a holder with mounting means comprising a tray having a receptacle for receiving by insertion a container, and a support extension that extends outward from the tray. An adjustable mechanism such as a button is utilized to widen the tray edge.

U.S. Patent Publication No. 20040188278 published to Krisko et al., describes a foldable beverage container holder, having an aperture forming a handle and a bottom panel for supporting a beverage container. The holder is simple and quick to assemble, and in the unfolded form is stackable and easily transported.

U.S. Pat. No. 4,630,319 issued to Mathis describes an article holding mechanism that includes a foldable pocket for retaining a beverage can that is kept within easy reach while driving a vehicle. The pocket may also comprise an attachable fastening means such as Velcro or buttons.

U.S. Pat. No. 6,409,066 issued to Schneider et al., describes a tote-bag cooler with multiple chambers that can be used for holding a beverage container, with a seat belt strap for securing the holder to a vehicle seat. This mechanism can be seen at FIG. 3A in the Schneider '066 issued patent.

SUMMARY OF THE INVENTION

A beverage cup holder. The beverage cup holder has a housing with a top and bottom, and includes first and second opposing arms for gripping the sidewalls of a cup or beverage container. The first and second opposing arms each comprise a plurality of telescoping chain-links. A retractable bottom support arm extends from the bottom of the housing for supporting the base of a beverage container. A retractable cup holder support arm extends from the top of the housing.

BRIEF DESCRIPTION OF THE DRAWINGS

Similar reference characters denote corresponding features consistently throughout the attached drawings.

DETAILED DESCRIPTION OF THE INVENTION

The present invention is directed to a beverage cup holder. The cup holder of the present invention is denoted generally by the numeric label "100".

The beverage cup holder 100 can be used to hold a variety of containers such as a "STARBUCK" cup of coffee, a can of soda such as "PEPSI, "COCA-COLA", "DIET PEPSI", "DR. PEPPER", etc. "STARBUCK", "PEPSI", "COCA-COLA, "DIET PEPSI", and "DR. PEPPER" are all Registered Trademarks.

Figure 1:
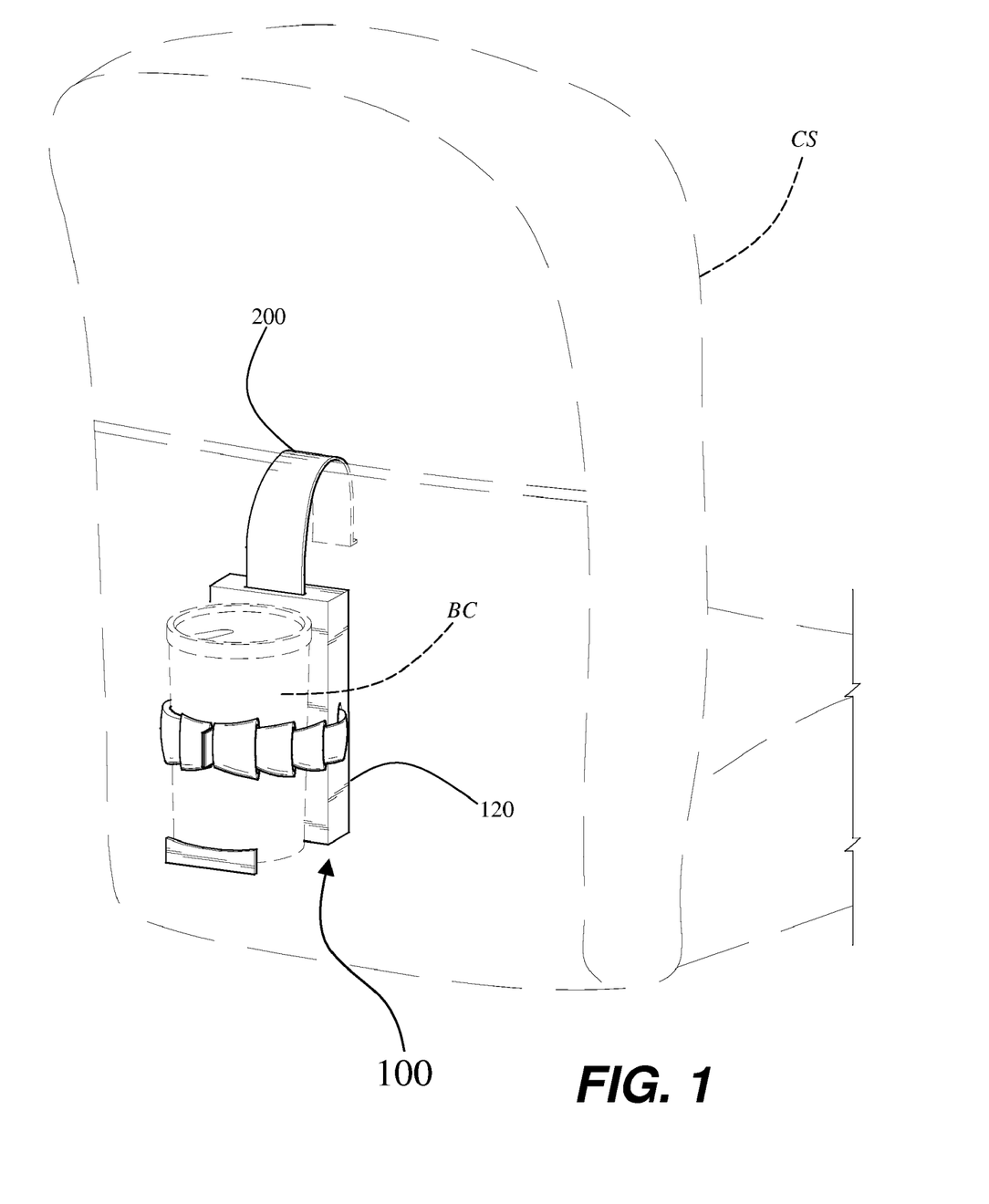
FIG. 1 is a perspective environmental view of a beverage cup holder according to the first embodiment of the present invention.
Figure 2:
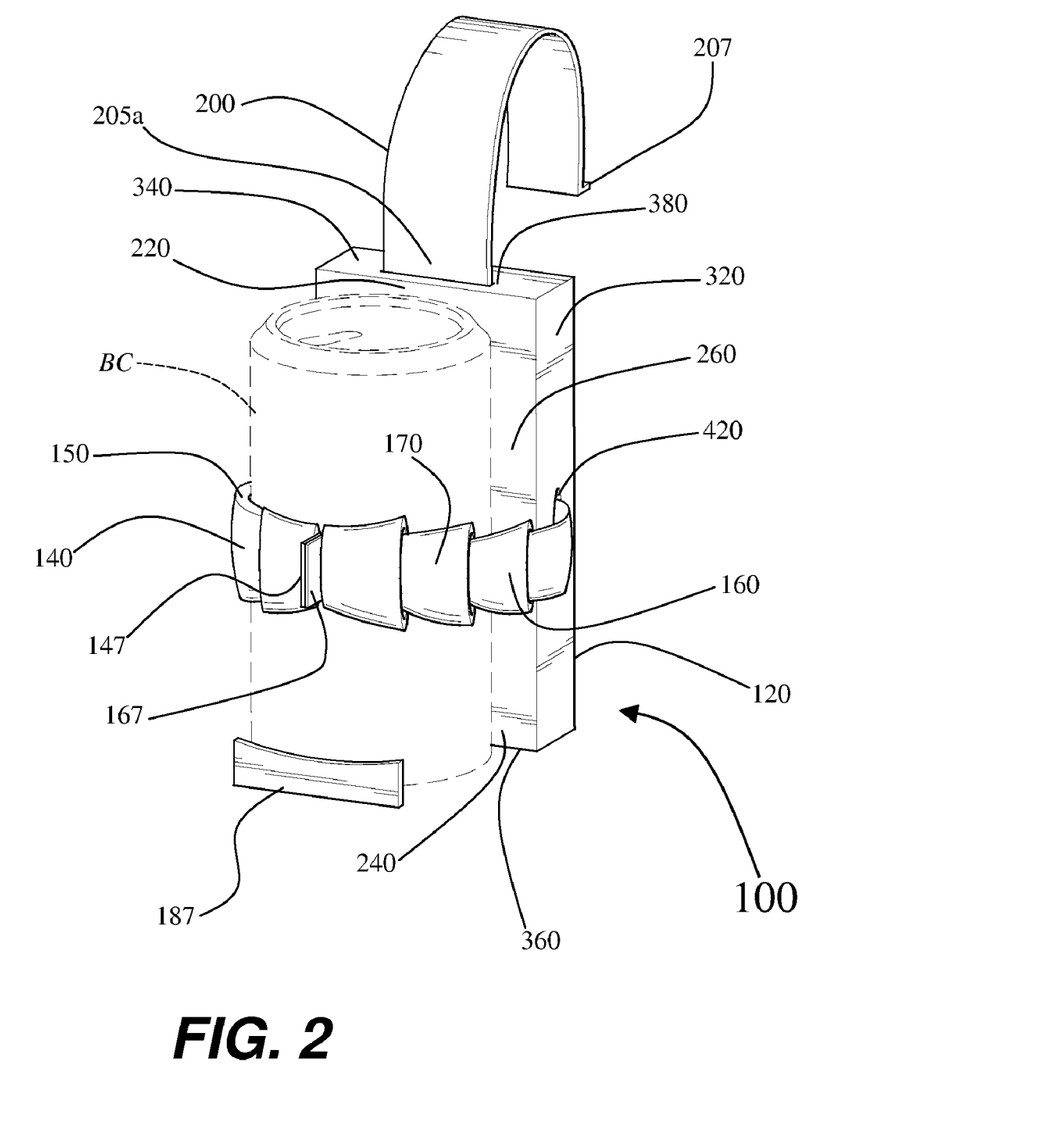
FIG. 2 shows a perspective view of the beverage cup holder of FIG. 1.
Figure 3:
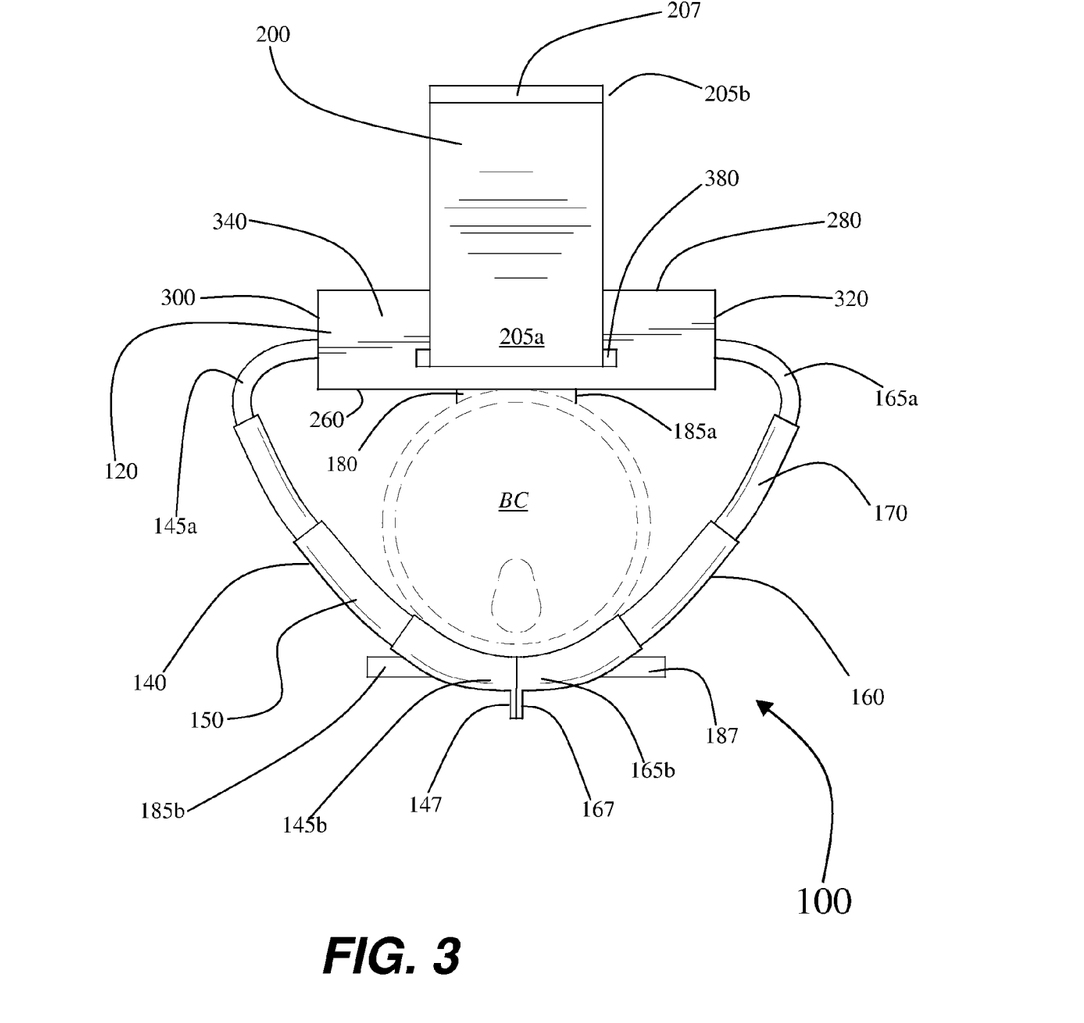
FIG. 3 shows a top view of the beverage cup holder of FIG. 1.
Figure 4:
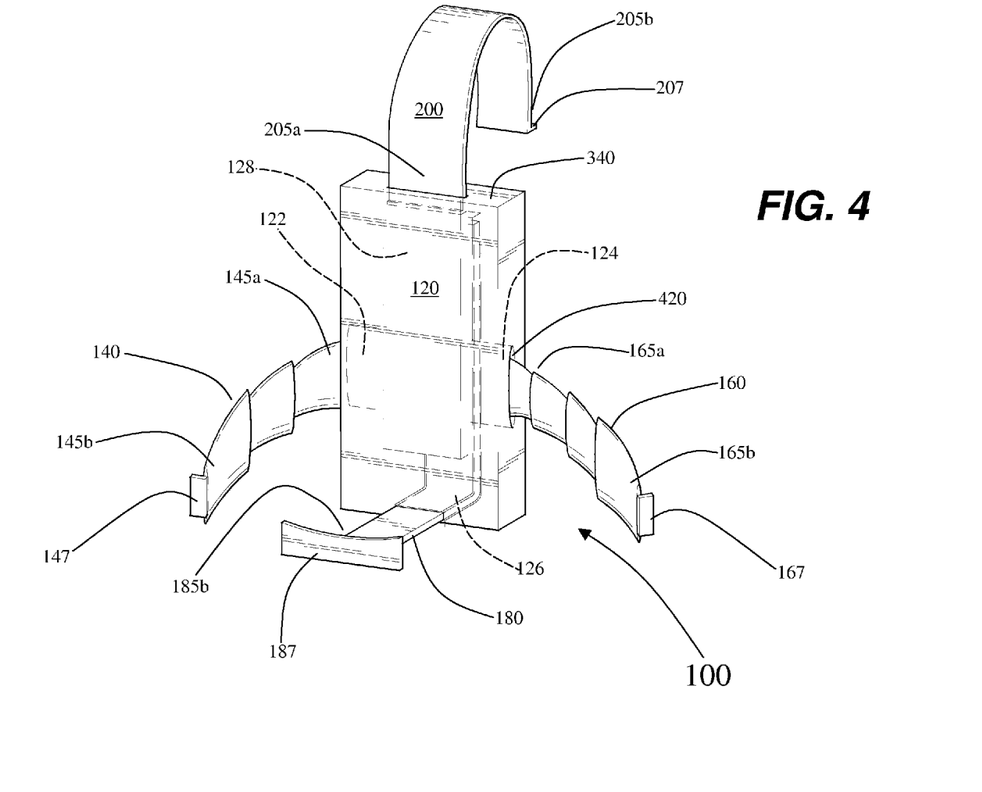
FIG. 4 shows a perspective view of the beverage cup holder according a first embodiment of the present invention.
Figure 5:
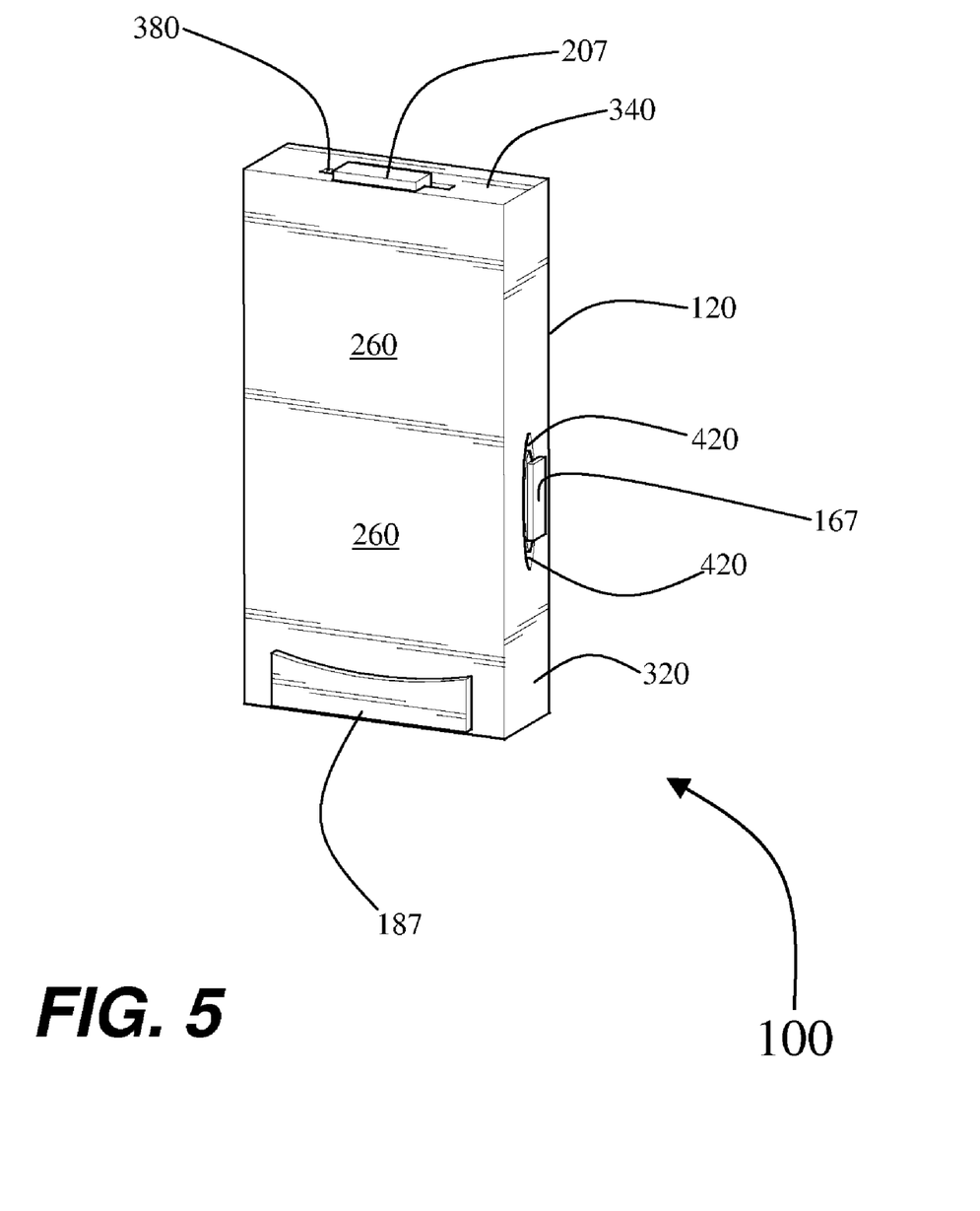
FIG. 5 shows a perspective view of the beverage cup holder according a first embodiment of the present invention.

FIG. 1 shows an environmental view of a first embodiment of the beverage cup holder 100. The beverage cup holder 100 is shown attached to the rear of a car seat CS and holding a beverage container BC. It is envisaged that the beverage cup holder 100 will be used to hold a cup or beverage container BC in environs that lack a sufficient number of permanent cup holders such as in older automobiles, trains, theatres, cinemas, planes, ship recreation and/or deck areas, etc.

Referring to FIGS. 1 through 6, which show different views of the beverage cup holder 100 according to the first embodiment of the present invention, the beverage cup holder 100 includes: a housing 120, first and second opposing arms 140 and 160 for gripping the sidewalls of a cup or beverage container BC, a bottom support arm 180 for supporting the base of a cup or beverage container BC, and a cup holder support arm 200. The cup holder support arm 200 is used to attach the cup holder 100 to any suitable fixture.

Still referring to FIGS. 1 through 6, the beverage cup holder 100 has generally rectangular dimensions. The housing 120 defines top and bottom ends 220 and 240, respectively. The housing further defines: a front surface 260, which extends between the top and bottom ends 220 and 240 of housing 120; a rear surface 280 that extends between the top and bottom ends 220 and 240 of housing 120; first and second side surfaces 300 and 320, respectively; a top end surface 340 and a bottom end surface 360.

The top end surface 340 defines a top end slot 380. The first and second side surfaces 300 and 320 respectively define first and second side slots 400 and 420. The front surface 260 defines a lower front surface slot 440 located proximate to the bottom end 240 of said housing 120. The first and second arms 140 and 160 extend telescopically from said first and second slots 400 and 420, respectively. The bottom support arm 180 being retractable and extendable from the lower front surface slot 440. The cup holder support arm 200 being retractable and extendable from the top end slot 380. The first 140 and second 160 opposing arms and the cup holder support arm 200 are at least partially stored inside housing 120 when not in use.

The first and second arms 140 and 160 are made of any suitable material such as plastic. The first arm 140 defines terminal ends 145a and 145b; second arm 160 defines terminal ends 165a and 165b; bottom support arm 180 defines terminal ends 185a and 185b; and cup holder support arm 200 defines terminal ends 205a and 205b. The first arm 140 comprises a plurality of telescoping chain-links 150 of progressively increasing dimensions from terminal end 145a to terminal end 145b. The second arm 160 comprises a plurality of telescoping chain-links 170 of progressively increasing dimensions from terminal end 165a to terminal end 165b.

In one embodiment, housing 120 defines storage pouches 122, 124, 126 and 128. The storage pouches 122, 124, 126 and 128 are used to respectively store arms 140, 160, 180 and 200. Thus, when the beverage cup holder 100 is not in use, the arms 140, 160, 180 and 200 can be retracted and at least partially stored in storage pouches 122, 124, 126 and 128, respectively (e.g., see FIGS. 4 and 5). The dimensions of the beverage cup holder 100 (with arms 140, 160, 180 and 200 retracted into housing 120) can be such that the cup holder 100 can be easily carried in a pocket such as, but not limited to, a coat pocket.

The terminal end 145b of opposing arm 140 defines slot-blocking member 147. The terminal end 165b of opposing arm 160 defines slot-blocking member 167. The terminal end 185b of bottom support arm 180 defines slot-blocking member 187. The terminal end 205b of cup holder support arm 200 defines slot-blocking member 207. The slot block members 147, 167, 187 and 207 function to prevent the accidental ingress into the housing 120 of arms 140, 160, 180 and cup holder support arm 200, respectively. It should be understood that slot block members 147, 167, 187 and 207 are optional; for example, the lengths of arms 140, 160, 180 and 200 can be chosen such that it is impossible to fully retract arms 140, 160, 180 and 200 into housing 120.

The telescoping arm 140 progressively widens between ends 145a and 145b; more specifically, the dimensions of telescoping chain-links 150 increase in size from end 145a to end 145b. Conversely, telescoping arm 140 progressively narrows between ends 145b and 145a; more specifically, the dimensions of telescoping chain-links 150 decrease in size from end 145b to end 145a.

Figure 11:
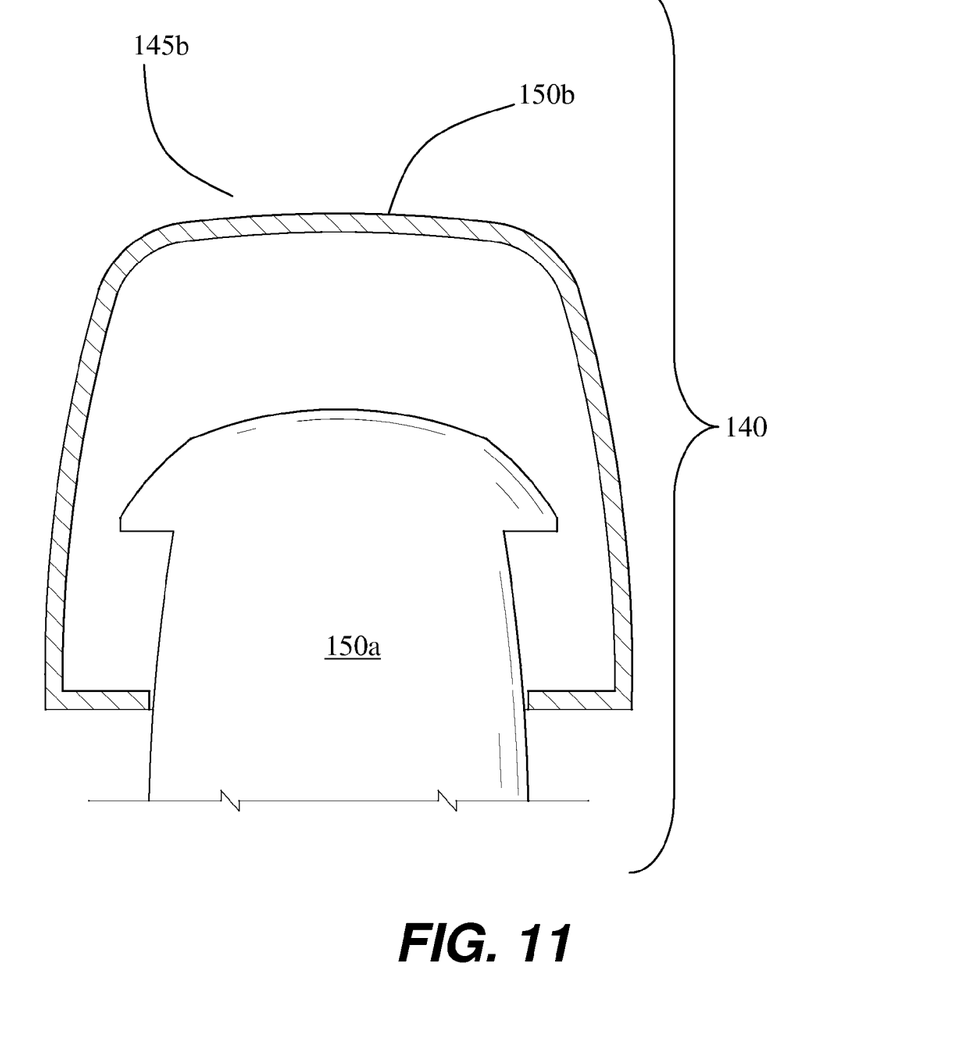
FIG. 11 shows a couple of telescoping chain-links according to the present invention.

The telescoping arm 160 progressively widens between ends 165a and 165b; more specifically, the dimensions of telescoping chain-links 170 increase in size from end 165a to end 165b. Conversely, telescoping arm 160 progressively narrows between ends 165b and 165a; more specifically, the dimensions of telescoping chain-links 170 decrease in size from end 165b to end 165a. Except for the last chain-link at ends 145b and 165b, the chain-links 150 and 170 fit slidably into their larger neighbor (see FIG. 11 where chain-link 150a can be collapsed into terminal chain-link 150b located at terminal end 145b). The chain-links 150 and 170 are reversibly retracted into pouches 122 and 124, respectively. It should be understood that the term "reversibly retracted" refers to the ability for arms 140, 160, 180 and 200 to be retracted into, or pulled our from, their respective pouches 122, 124, 126 and 128.

Figure 6:
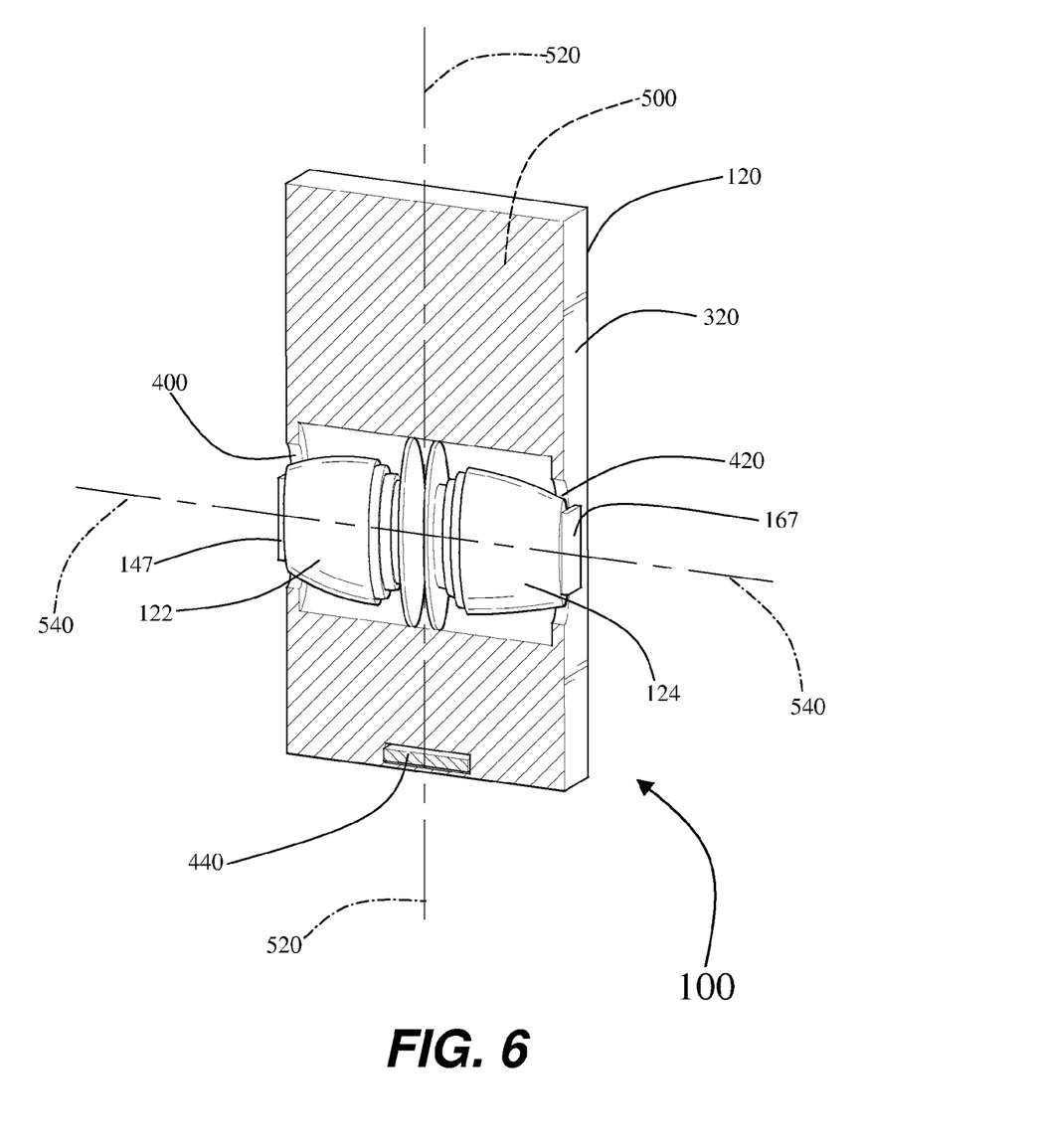
FIG. 6 shows a cutaway view of the beverage cup holder of FIG. 1.
Figure 7:
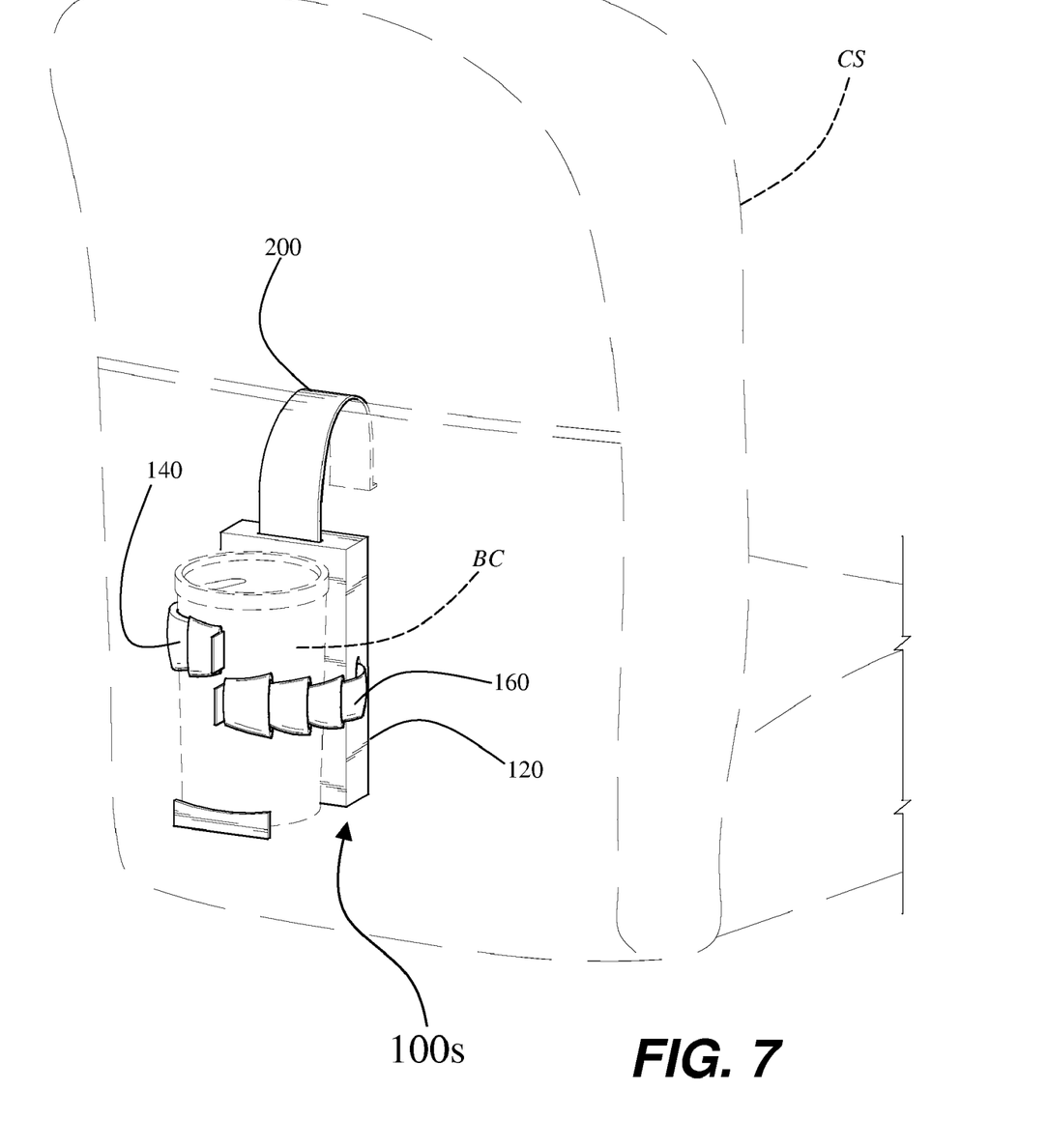
FIG. 7 is a perspective environmental view of a beverage cup holder according to the second embodiment of the present invention.
Figure 8:
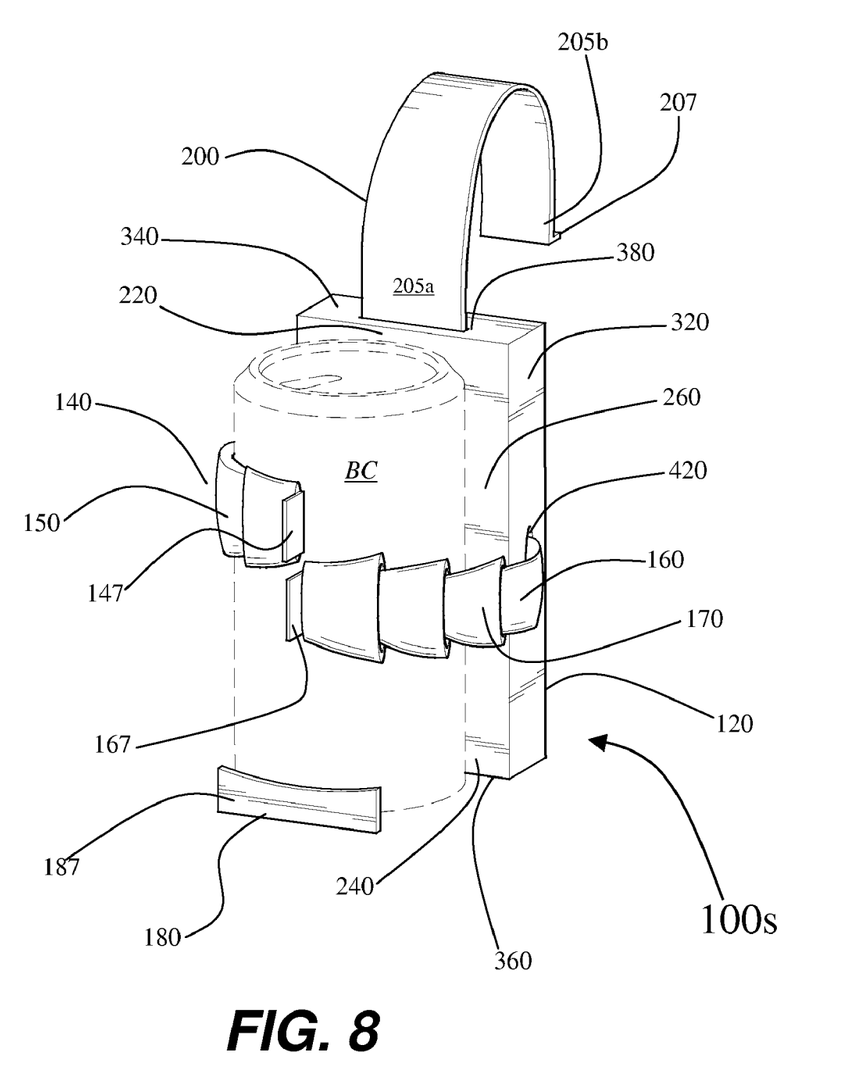
FIG. 8 shows a perspective view of the beverage cup holder of FIG. 7.
Figure 9:
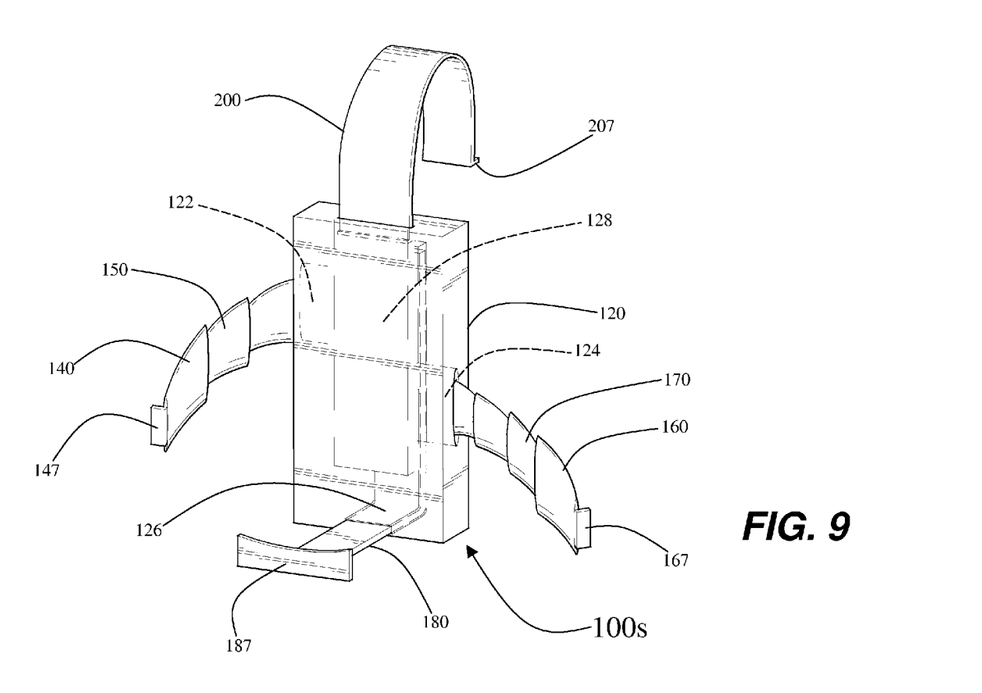
FIG. 9 shows a perspective view of the beverage cup holder of FIG. 7.
Figure 10:
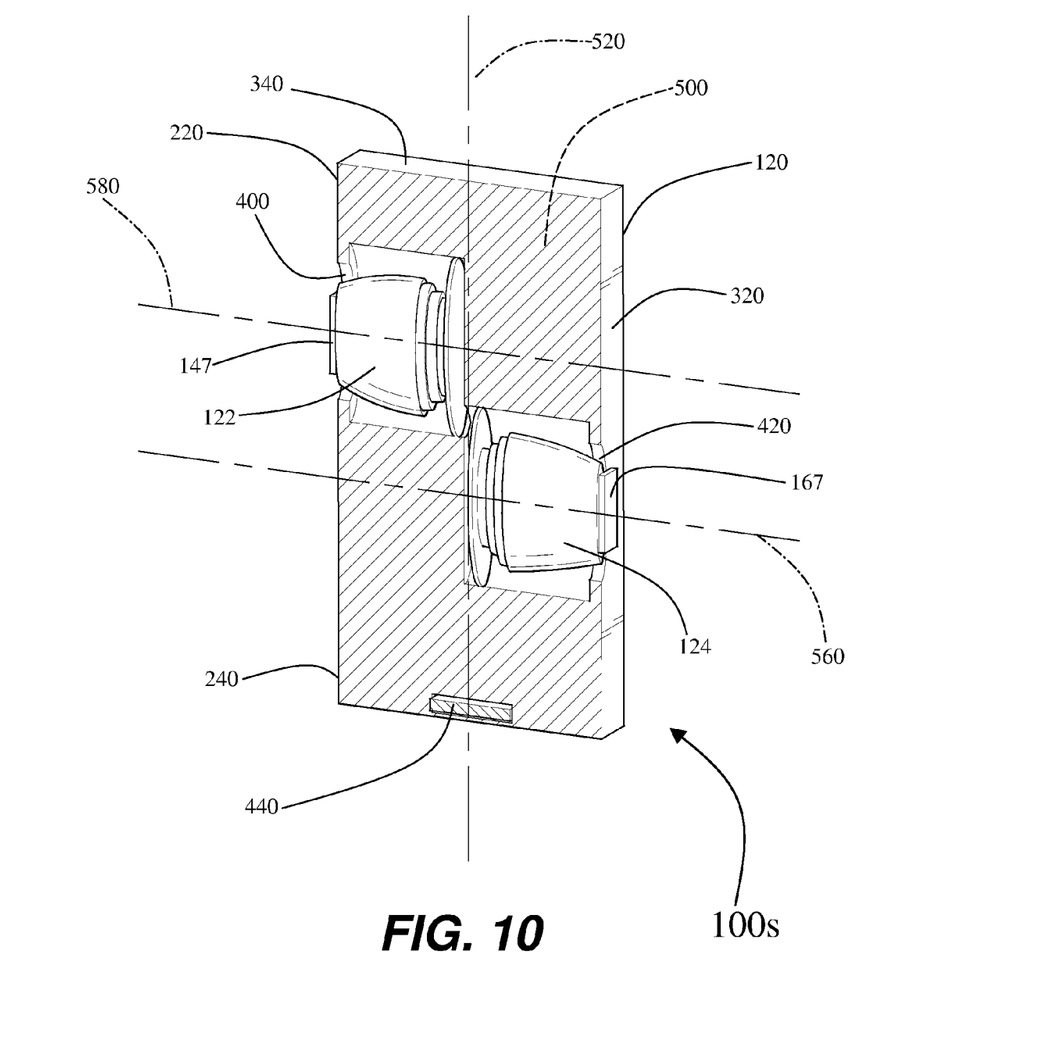
FIG. 10 shows a cutaway view of the beverage cup holder of FIG. 7.

Referring to FIG. 6 that shows a cutaway view of the housing 120 along a vertical reference plane 500, in this figure the arms 180 and 200 are ignored. A central vertical reference axis 520 bisects housing 120 in the vertical plane 500. The first and second side slots 400 and 420 and associated pouches 122 and 124 share a horizontal reference axis 540. The horizontal reference axis 540 is located in the vertical plane 500. The central vertical reference axis 520 and the horizontal reference axis 540 are perpendicular with respect to each other. The arms 140 and 160, except for slot blocking members 147 and 167, are hidden from view in retracted configuration stored in pouches 122 and 124, respectively. In this first embodiment of the invention the arms 140 and 160 are aligned in opposing directions, i.e., the arms 140 and 160 are substantially opposite each other.

Referring to FIGS. 7 through 10, which show various views of the second embodiment of the present invention, the first and second opposing arms 140 and 160 are in a staggered configuration with respect to each other. More specifically, the first and second side slots 400 and 420 (or pouches 122 and 124) respectively define horizontal reference axes 560 and 580. The horizontal reference axes 560 and 580 are parallel with respect to each other with the axis 580 located above axis 560 with respect to the vertical reference plane 500 such that arms 140 and 160 respectively telescope from or retract into pouches 122 and 124 in a staggered configuration.

The various parts of the beverage cup holder 100 can be made out of any suitable material such as moldable and/or extrudable plastic. For example, the telescoping arms 140 and 160 are fashioned to have an inherent inward curling effect such that the arms 140 and 160 curl back in the direction of front surface 260 to grip a beverage container. Cup holder support arm 200 is fashioned to have an inherent backward curl such that upon extending arm 200 from housing 120 via top end slot 380 the arm 200 initially curls backward from rear surface 280 (shown in FIG. 3) and then towards rear surface 280. Arm 180 is designed to provide a horizontal support to the base of a beverage container such as a soda can.

It is to be understood that the present invention is not limited to the embodiments described above, but encompasses any and all embodiments within the scope of the following claims.

I claim:

1. A beverage cup holder for supporting variety of containers on a fixed object, comprising a housing of generally rectangular dimensions, said housing defining top and bottom ends, said housing further defining:
  a front surface extending between said top and bottom ends of said housing,
  a rear surface extending between said top and bottom ends of said housing,
  first and second side surfaces,
  a top end surface between front and rear surfaces, and
  a bottom end surface between front and rear surfaces,
    wherein said top end surface defines a top end slot;
    wherein said first and second side surfaces respectively define first and second side slots,
    wherein said front surface defines a front surface slot located proximate to the bottom end of said housing;

first and second opposing arms for gripping the sidewalls of a cup or beverage container, said first and second opposing arms respectively extend telescopically in a horizontal direction from said first and second slots, said first and second opposing arms each comprise of a plurality of telescoping chain-links;

a bottom support arm for supporting the base of the cup or beverage container, said bottom support arm being retractable and extendable from said front surface slot; and a housing support arm, said housing support arm extends telescopically from said top end slot, wherein said first and second opposing arms are at least partially storable inside said housing when not in use, and wherein said housing support arm is at least partially storable inside said housing when not in use.

2. The beverage cup holder of claim 1, wherein said first and second opposing arms are opposite each other.

3. The beverage cup holder of claim 1, wherein said first and second opposing arms are in a staggered configuration with respect to each other.

* * * * *